United States Patent [19]

Honeycutt

[11] 4,066,176

[45] Jan. 3, 1978

[54] TOBACCO HARVESTER

[76] Inventor: Bass Honeycutt, Rte. 5, Clinton, N.C. 28328

[21] Appl. No.: 661,129

[22] Filed: Feb. 25, 1976

[51] Int. Cl.² .............................................. B65G 67/22
[52] U.S. Cl. .................................... 214/43; 214/83.1; 56/16.6; 56/27.5; 56/330
[58] Field of Search .................... 214/83.36, 83.1, 515, 214/518, 520, 521, 522, 43, 42 R; 280/32.5, 411 R; 56/27.5, 473.5, 16.6, 330

[56] References Cited

U.S. PATENT DOCUMENTS

| | | | |
|---|---|---|---|
| 3,229,831 | 1/1968 | Long | 214/83.1 |
| 3,258,141 | 6/1966 | Davis | 214/83.1 |
| 3,654,753 | 4/1972 | Gervais | 56/27.5 |
| 3,834,137 | 9/1974 | Long | 56/27.5 |

*Primary Examiner*—Robert J. Spar
*Assistant Examiner*—Lawrence E. Williams
*Attorney, Agent, or Firm*—Mills & Coats

[57] ABSTRACT

In abstract, a preferred embodiment of this invention is a tobacco harvester wherein a centrally disposed trailer attached to a towing vehicle is straddled by a worker support platform. Mechanical means are also provided for conveying the product harvested by the workers into the centrally disposed trailer.

8 Claims, 6 Drawing Figures

TOBACCO HARVESTER

This invention relates to harvestering devices and more particularly to tobacco harvesters.

In the past various types of harvesters have been developed for use in conjunction with leaf type crops such as tobacco. Some of these devices have been self-propelled with workers riding thereon. Some of these harvesters have had a platform above the workers with mechanical conveying means to move tobacco from the picking or priming area up to the "racking" area.

Other harvesters, usually less expensive in production cost, have been developed on which the workers ride, some of these having raised platforms for racking areas and are even provisioned for a trailer to be towed behind the harvester to load the filled bins or racks onto. A third broad category of tobacco harvesters are the automatic primers but these are relatively compact and extremely expensive, and, therefore, cannot be justified economically except by farmers or coops with large acreage allotments.

The problem with each of these prior known systems and their modifications have been there is no convenient way to get the harvested product from the harvester to the processing area, or in the case of tobacco, to the curing barn. Even though detachable trailers have been used, these invariably require an intermediate handling step which requires one or more laborers which in turn greatly increases the cost of the harvestering process.

After much research and study into the above mentioned problems, the present invention has been developed to provide a unique tobacco type harvesting system wherein the harvested product is conveyed directly from the harvesting position to a separable conveyance for transportation of the product to the processing area. This separable conveyance is preferably in the form of a trailer with the workers riding on either side thereof, but separate therefrom, with a mechanical conveyor conveying the primed tobacco from the priming position up and into the centrally disposed trailer. Also, the trailer can be so designed that the containers thereon are bulk curing containers so that there is no transfer operation at the curing barn but the containers can simply be placed therein, and the curing process commenced.

In view of the above, it is an object of the present invention to provide a harvesting system of the tobacco type wherein the harvested or primed leaves are conveyed directly from the priming position to a separable conveyance for transport to the curing enclosure.

Another object of the present invention is to provide, in a tobacco type harvesting system, a means for supporting workers on each side of a separable conveyance with means for automatically moving the harvested or primed leaves from the priming station into the separable unit.

Another object of the present invention is to provide a tobacco type harvesting system wherein a harvesting conveyance and a separable conveyance move in adjacent cooperation with each other and yet are not in any way connected.

Another object of the present invention is to provide in a tobacco type harvesting system, a means for conveying the primed leaves automatically from the priming station into the curing container without intermediate handling thereof.

Another object of the present invention is to provide a worker supporting, tobacco type harvester which is designed to straddle a trailer which receives the harvested product.

Another object of the present invention is to provide a tobacco type harvester with a conveyance for moving the harvested product directly from the harvesting position to a trailer type receptacle wherein both the harvester and the receptacle are towed in lateral alignment behind a tractor type vehicle.

Another object of the present invention is to provide a tobacco type harvester with a conveyance for moving the harvested product directly from the harvesting position to a trailer type receptacle wherein both are separably towed in lateral alignment behind a tractor.

Other objects and advantages of the present invention will become apparent and obvious from a study of the following description and the accompanying drawings which are merely illustrative of such invention.

IN THE DRAWINGS:

FIG. 1. is a perspective view of the harvesting system of the present invention;

Figure 1:
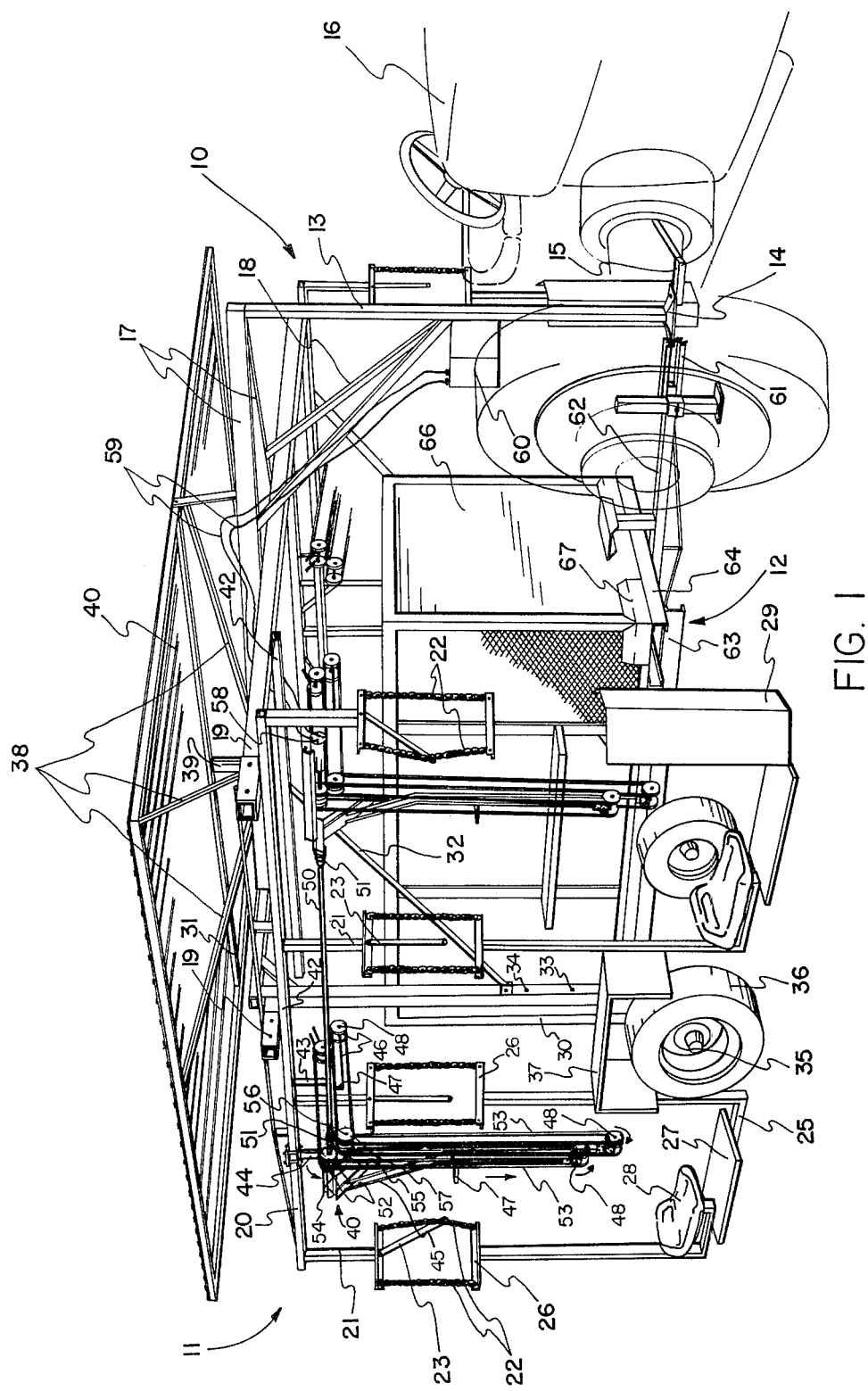
Figure 2:
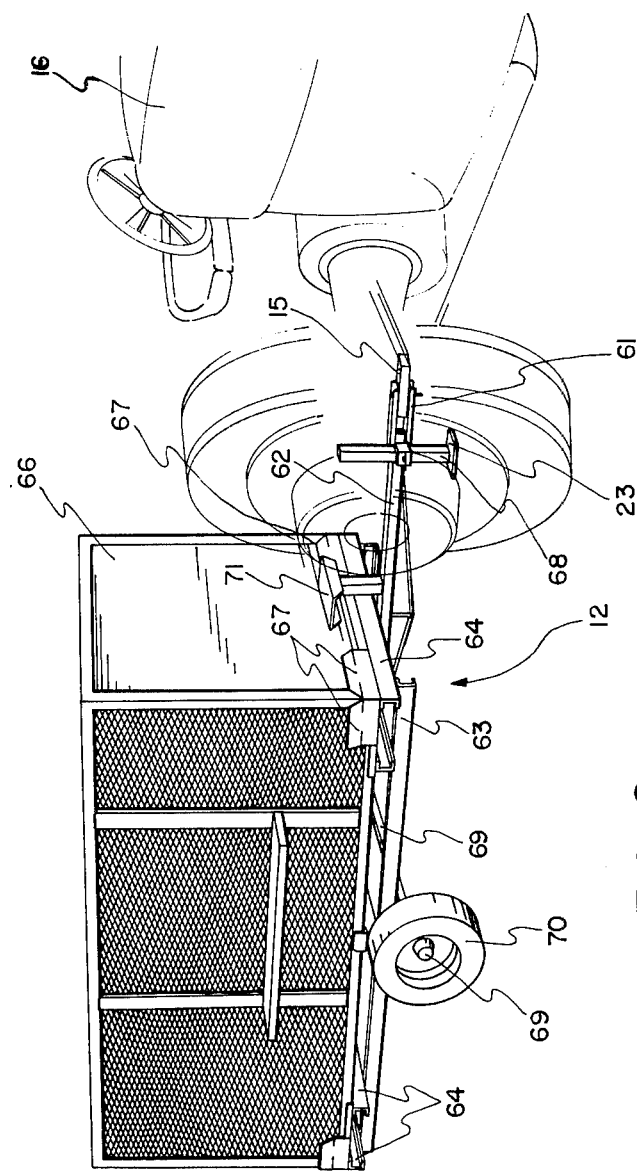
FIG. 2 is a perspective view of the trailer portion of the present invention.
Figure 3:
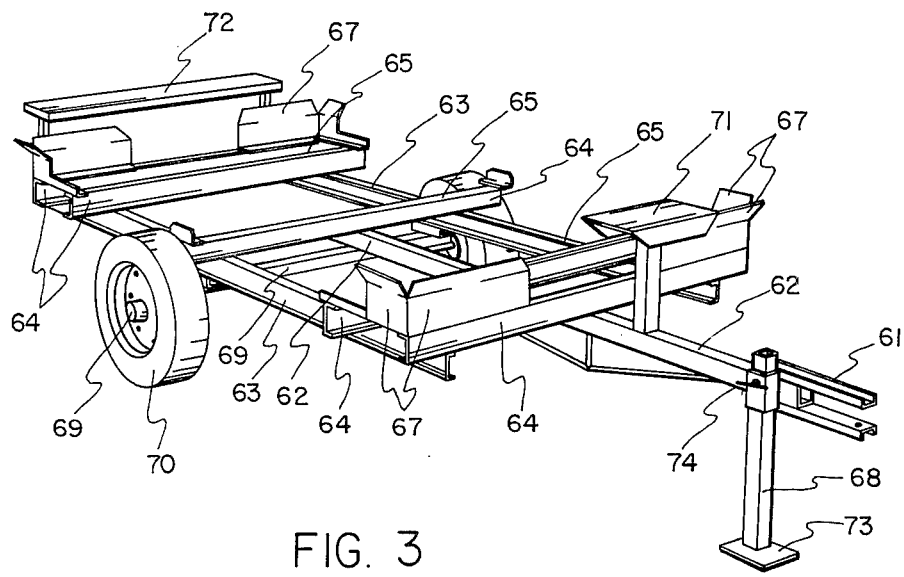
FIG. 3 is a front perspective view of the frame of said trailer.
Figure 4:
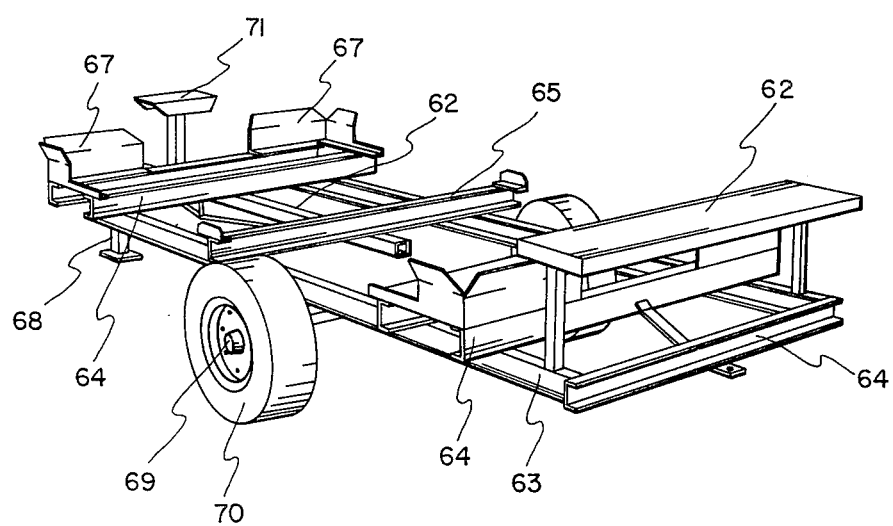
FIG. 4 is a rear perspective view of the same.
Figure 5:
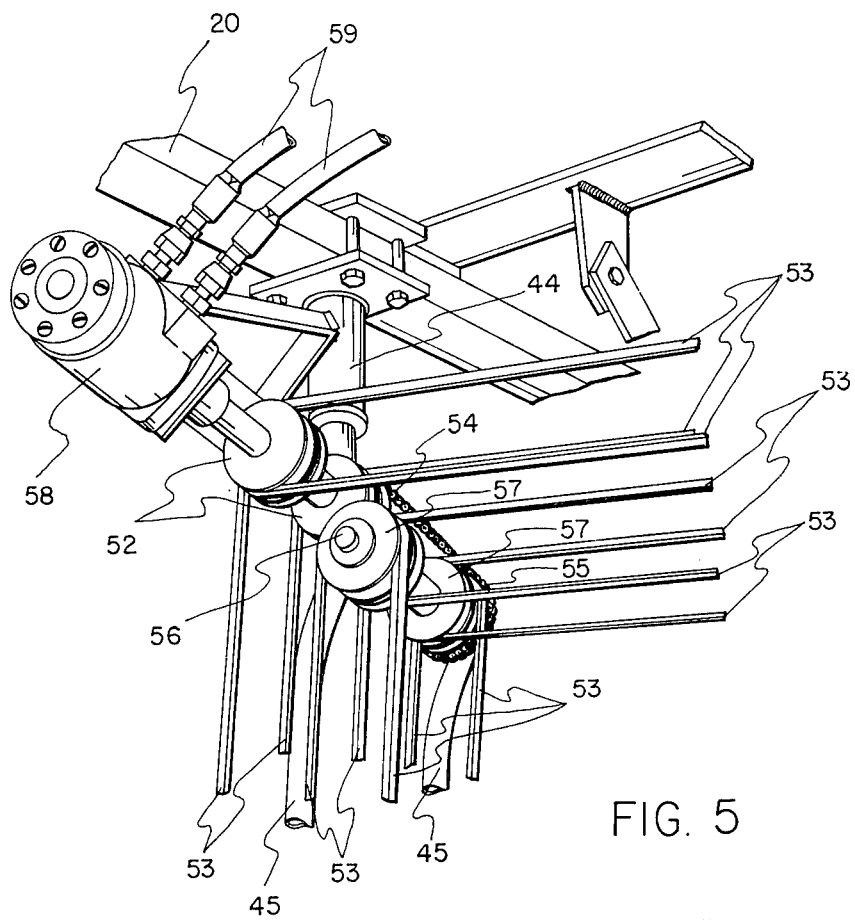
FIG. 5 is an enlarged perspective view of a faction of the conveyor system of the present invention.
Figure 6:
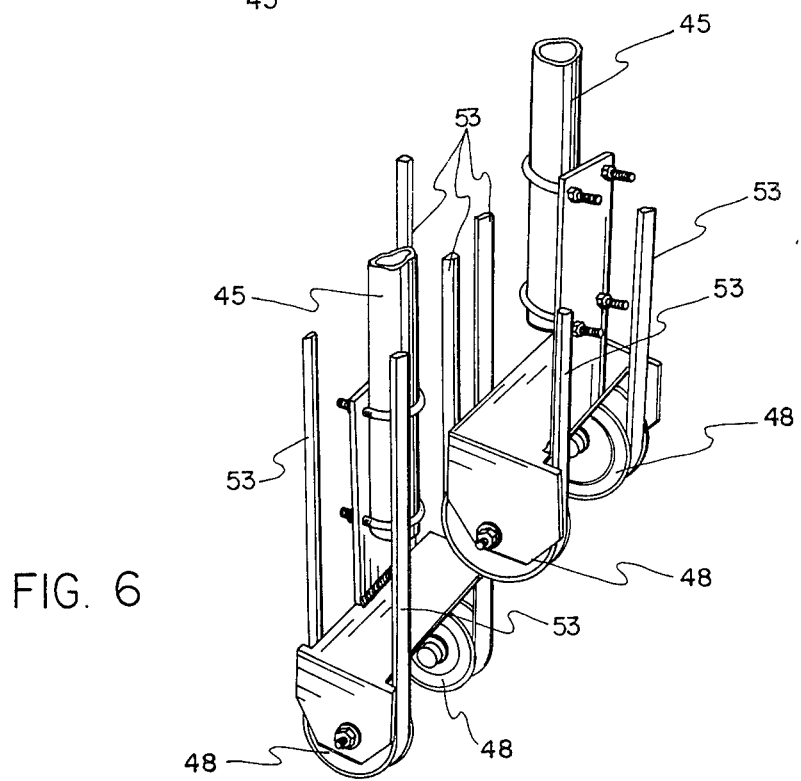
FIG. 6 is an enlarged perspective view of the feed portion thereof.

With further reference to the drawings, the harvesting system of the present invention, indicated generally at 10, is composed of a harvester unit, indicated generally at 11 which is straddlingly disposed about a harvested crop transport unit, indicated generally at 12.

The harvester unit 11 is constructed of a plurality of frame means carrying crop conveyors and worker riding stations. This frame is composed of a vertical tow frame 13 having a standard coupler foot 14 secured to its lower end for pivotable mounting on the tow bar 15 of a standard tractor 16.

The upper end of tow frame 13 is fixedly secured to V-shaped horizontal frame 17. To strengthen the joint between frame 13 and 17, a pair of braces 18 are fixedly secured therebetween.

A pair of lateral cross members 19 are fixedly secured across frame 17.

Secured to each end of lateral cross members 19 are longitudinally disposed support members 20. Fixedly secured to, and depending from support member 20 are two pairs of inverted T-shaped worker station supports 21. To the outer ends of each of these station supports is secured a chain hanger 22. These hangers allow the worker to move relatively freely from side to side during the harvesting or priming operation.

A swing dampening arm 23 is pivotably mounted in the center of each of the station supports 21 and when the other end thereof is placed in engagement with one of the chain hangers 22 the swinging motion of the worker station, indicated generally at 24, is dampened.

Each of the worker stations is composed of a generally U-shaped frame members 25 having a T-shaped cross bar 26 fixedly secured to each end thereof. The end of each cross bar 26 is secured to one of the chain hangers 22. The connection between the chain hanger and the cross bar is adjustable so that the height of the bottom of frame 25 can be adjusted up or down for correct worker position during the harvesting operation.

Secured to each of the frames 25 is a leg support 27 for the worker as well as a seat 28 as seen clearly in FIG. 1. Additionally, a guard 29 is provided on the forward portion of both of the front worker stations 24. This, of course, is to prevent damage to the unharvested leaves as the harvester brushes thereagainst as it passes through the field.

Fixedly secured to each end of the rearmost lateral cross member 19 is a generally vertically disposed wheel strut 30. These struts are steadied against undesirable lateral movement by brace 31 and against undesirable longitudinal movement by brace 32. As can clearly be seen in FIG. 1, the upper end of lateral brace 31 is secured to the rearmost cross member 19 while the uppermost end of brace 32 is secured to forward cross member 19.

The lower portion of strut 30 is telescopic in construction and has provided therein a plurality of openings 33. These openings are adapted to receive pins or bolts 34. The purpose, of course, in having a plurality of openings with removal pins or bolts is so that the length of strut 30, and thus the overall height of the harvester unit, can be adjusted.

An axle 35 is provided on the lower end of each of the struts 30 and a wheel 36 is rotatively mounted thereon. Also secured to the lower portion of strut 30 is a wheel fender 37.

Secured to the center of the rearmost cross member 19 are a plurality of outwardly radiating arms 38. These arms, in combination with center post 39, support shade or cover 40. The purpose of this cover is to protect the trailer unit 12 and the contents thereof from the direct rays of the sun which could damage the contents and from rain showers which would add an additional undesirable amount of moisture which would have to be removed during the curing process.

A leaf conveying system, indicated generally at 41, is basically a double belt gripping and conveying means.

A conveyor stringer 42 is secured to the lateral cross members 19 on each side of the longitudinal center line of the harvester unit 11 and generally parallel thereto. Each of these stringers carries a depending conveyor hanger 43 on each end thereof. A second conveyor hanger 44 is dependingly secured to each end of each longitudinal support member 20 in lateral alignment with one of the conveyor hangers 43. To each thusly aligned pair of hangers 43 and 44 is secured at the lower end thereof a generally L-shaped conveyor frame 45. A second generally L-shaped conveyor frame 46 is provided which is secured to and supported by frame 45 through the use of generally U-shaped connecting members 47 which are secured to said frames at each end thereof. Thus it can be seen that from stringers 42 and support members 20, through hangers 43 and 44, conveyor frame 45 is supported. Through U-shaped connecting members 47, a second adjacent conveyor frame 46 is supported.

Rotatively mounted on either side of each end of each of the L-shaped conveyor frames 45 and 46 are pulley wheels 48. Each of these pulleys are freewheeling as will become apparent from the following description.

Conveyor system drive shafts 49 are interconnected on each side of the harvester unit by intermediate drive shaft 50. The connection between these drive shafts are universal joints as can clearly be seen at 51.

One of the conveyor drive shafts is rotatively mounted at the apex of each of the L-shaped conveyor frames 45. A pair at the apex of each of the L-shaped conveyor frames 45. A pair of drive pulleys 52 are fixedly secured to each drive shaft 49 on each side of each conveyor frame 45.

To each of the drive shafts 49 is also secured a sprocket 54. A second sprocket 55 is fixedly secured to shaft 56 which is rotatively mounted at the apex of each L-shaped conveyor frame 46. A drive chain 75 is operatively trained about each adjacent pair of sprockets 54 and 55. Pairs of drive pulleys 57 are mounted on either side of each of the frames 46 in a similar manner to pulleys 52 on frames 45. Each of the pulleys 57 are, of course, fixedly secured to shaft 56.

Thus it can be seen that when pulley belts 53 are trained between pulley wheels 48 and drive pulleys 52 and 57 as seen in FIG. 1, and drive shafts 49 rotated in the direction of the arrows, the conveyor belts 53 will move in the direction indicated to transport primed leaves or other products grippingly therebetween from the harvesting station adjacent seat 28 to the area immediately above trailer unit 12.

Operatively connected to at least one of the conveyor drive shafts 49 on each side of the harvester unit 11 is a source of rotative power, preferably in the form of a hydraulic motor 58. From each of these motors, a hydraulic line 59 leads to a standard hydraulic system (not shown) contained within enclosure 60. This control system can be either driven by the power takeoff of the tractor 16 or can be motivated by the standard hydraulic system of such tractor. Since drive means of this type are well known to those skilled in the art, further discussion of the time is not deemed necessary.

From the above, it can be seen that a tunnel like opening is provided longitudinally through the center portion of harvester unit 11 with such unit being straddlingly disposed about trailer unit 12. This latter unit is pivotably attached to the rear of coupler foot 14 and on the side thereof opposite tow bar 15. This pivotable connection is through coupler 61 which is fixedly secured to the trailer tongue 62.

A trailer frame consisting of longitudinal members 63 welded or otherwise secured to cross members 64 is provided. The upper portion 65 of cross members 64 forms the bed for a harvested product container such as the bulk curing box shown at 66. This box is preferably perforate on its sides and bottom, open at the top, and imperforate on its ends. It is so sized as to be usable in a bulk curing enclosure (not shown) without requiring further transfer of the contents in the box until after the curing process has been completed.

A plurality of guide flanges 67 are provided on each corner of the upper portion 65 of trailer unit 12. These flange guides of course, are to aid in the quick and correct alignment of box 66 or the trailer unit. Since the function of these guide flanges, once shown, are obvious to one skilled in the art, further detail description thereof is not deemed necessary.

Landing gear 68 is adjustably provided on tongue 62 and is used in the standard manner of such devices. Said landing gear includes a foot portion 73 and a set screw type releasable securing means 70.

An axle 69 is fixedly secured to longitudinal trailer frames 63 and has rotatively mounted on each end thereof a wheel 70.

Slightly raised platforms 71 and 72 are provided on opposite ends of trailer unit 12 and are for the purpose of allowing workers to reach parts of the harvester system which would otherwise be inconvenient should adjustment become necessary.

To use the harvester system of the present invention, the coupler foot 14 is pivotably attached to tow bar 15 of tractor 16 in the usual manner. The trailer coupler 61 is then pivotably attached to coupler foot 14 thus allowing the tractor 16 to tow both the harvester unit 11 and the trailer unit 12. Curing box 66 is retained within corner flanges 67 during the initial portion of the harvesting operation. The hydraulic system container within housing 16 is operatively connected to the hydraulic system (not shown) of tractor 16.

Once the harvester has been towed by the tractor to the field and is in initial position, workers mount each side of the harvester unit 11 on seats 28. The hydraulic system to drive motor 58 is activated thus causing the conveyor system 41 to move as indicated by the arrows in FIG. 1.

The tractor 16 then begins to tow the harvester system 10 down the row of the field so that the workers on the seats 28 can harvest or prime the crop. In the case of tobacco, the primed leaves are placed between the moving juxtaposed conveyor belts 53 and thus they move upwardly and then inwardly to a point above the open top of curing box 66. Leaves are then moved clear of the conveyor and fall by gravity to such box. This process is continued until such time as box 66 is filled to capacity. Once this occurs, trailer unit 12 can be disconnected from coupler foot 14 and towed by any other convenient vehicle or towing means to the curing enclosure. Another trailer can immediately be connected to the coupler foot and the harvesting operation continued.

When the full curing box and its associated trailer unit 12 reach the curing enclosure (not shown), box 66 is lifted from the trailer and placed in the curing enclosure in the standard manner. The trailer is then available for an empty curing box to be placed thereon and moved back to the field where the harvesting operation is being conducted. As soon as the trailer unit that is being towed is full, then the original unit can replace the second unit and, with only a momentary stop, the harvesting operation can be continued.

In case of showers or similar inclement weather, the shade or cover 40 will protect the crop within curing box 66 from picking up undue amounts of moisture. Also, the crop is protected from both the ultraviolet rays of the sun and the heat created by direct sunlight.

From the above, it can be seen that the present invention has the advantage of providing a highly efficient harvesting system which requires only momentary stoppage of the harvesting process to remove the container receiving the harvested product and to replace the same. Also, the present invention eliminates the necessity of having workers stationed in the area adjacent the placing of harvested products in curing containers since this is automatically accomplished. Further the present invention has the advantage of being relatively low in profile which allows the same to be operated in low clearance areas. The present invention has the even further advantage of being relatively inexpensive to produce and yet is highly efficient in operation.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced therein.

What is claimed is:

1. A crop harvesting system comprising: a self-supporting harvester unit for harvesting said crop; a self-supporting harvested crop transport unit for receiving said crop following harvesting of the same, said harvester unit being separate and independent from and straddledly disposed about said transport unit whereby said transport unit can be removed and replaced without moving or affecting said harvester unit; and means for coordinatingly propelling said units across the field to be harvested whereby such harvesting can be readily accomplished.

2. The harvesting system of claim 1 wherein the crop transport unit is in the form of a wheeled vehicle with a bulk curing type container removably mounted thereon.

3. The harvesting system of claim 1 wherein said means for propelling said units is a tractor.

4. A crop harvesting system comprising: a self-supporting crop transport unit; a self-supporting, separate and independent crop harvesting unit straddlingly disposed about said transport unit means associated with said harvesting means for conveying harvested crop to a point above said transport unit whereby said crop can be deposited in said last mentioned unit; and means for coordinatingly propelling said units across the field being harvested.

5. The harvesting system of claim 4 wherein the transport unit is in the form of wheeled vehicle with a bulk curing type container removably mounted thereon.

6. The harvesting system of claim 4 wherein the conveying means is in the form of at least one double belt conveyor system.

7. The harvesting system of claim 4 wherein a shade type cover is provided above said harvester unit.

8. The harvesting system of claim 4 wherein said means for propelling said units is a tractor.

* * * * *